United States Patent [19]

Bethge et al.

[11] 4,284,452
[45] Aug. 18, 1981

[54] METHOD OF EMBEDDING THIN WIRES IN LAMINATED GLASS

[75] Inventors: Walther Bethge; Dietrich Bethge, both of Riehen, Switzerland

[73] Assignee: Therglas GmbH fur Flachenheizung, Riehen, Switzerland

[21] Appl. No.: 117,280

[22] Filed: Jan. 31, 1980

[30] Foreign Application Priority Data

Feb. 12, 1979 [CH] Switzerland .................. 1316/79

[51] Int. Cl.³ .................. B32B 17/12; B32B 31/00; H05B 3/06
[52] U.S. Cl. .................. 156/99; 156/176; 156/298; 156/303.1; 264/272 R
[58] Field of Search .......... 156/99, 102, 176, 177, 156/178, 298, 303.1, 168, 155; 219/522, 203; 264/272, 263; 428/38; 338/302

[56] References Cited

U.S. PATENT DOCUMENTS

| | | | |
|---|---|---|---|
| 2,813,960 | 11/1957 | Egle | 219/203 |
| 3,409,759 | 11/1968 | Boicey et al. | 219/522 |
| 3,635,777 | 1/1972 | Bethge | 156/441 |
| 3,729,616 | 4/1973 | Gruss et al. | 219/522 |
| 3,745,309 | 7/1973 | Gruss | 219/522 |
| 3,769,125 | 10/1973 | Bethge | 156/176 |
| 4,209,687 | 6/1980 | Bethge et al. | 219/203 |

FOREIGN PATENT DOCUMENTS

2802152 3/1978 Fed. Rep. of Germany.

OTHER PUBLICATIONS

Copy of U.S. Serial No. 870,416, filed Jan. 18, 1980.

*Primary Examiner*—Michael W. Ball
*Attorney, Agent, or Firm*—Olsen and Stephenson

[57] ABSTRACT

The invention relates to a method wherein thin wires are three-dimensionally embedded in a uniformly finely undulating manner in the intermediate film of laminated glass by filaments of the same base material as the intermediate film with wire wound around them in stretched helical coil configuration being pressed into the film and made to disappear during the pressing procedure to form the laminate. Manufacture is simplified, economical and efficient. Also, better visibility conditions are obtained. The method is specially suited for the manufacture of heated panes for all kinds of transportation.

5 Claims, No Drawings

METHOD OF EMBEDDING THIN WIRES IN LAMINATED GLASS

The invention relates to a method of embedding thin wires in the intermediate film of laminated glass, preferably for heated panes.

Laminated glass panes wherein a plurality of suitably disposed thin wires forms a surface-wise heating grid, have been successfully employed in all kinds of transportation for maintaining visibility in bad weather and have manifested their advantages over other heated panes. By treating the laminated glass panes to make their surface matt and disposing the fine wires in an undulating manner, the reflection and diffraction of the light at the wires is reduced to such an extent that the optical impairment causes less of a disturbance.

Three-dimensional arrangement of the wires in the form of stretched helical coils in the intermediate film of the laminated glass substantially eliminates impairment of vision through the panes, as described in Patent . . . (German Laid Open Patent Application P 02 152.3-34).

This improvement in visibility conditions does, however, involve complex manufacture, leading to considerable costs. On account of the resultant high price, use, for example, for heated panes remained confined to a few important fields and was minimal in motor vehicles.

The object underlying the invention is to provide a method of manufacturing laminated glass with an insert of thin wires, preferably for heated panes, which, while accomplishing an improvement in quality, enables manufacture to be simplified and rationalized with a view to substantially expanding the market. In particular, the invention relates to a manufacturing method for three-dimensionally embedding in uniformly gently undulating configuration thin wires in the intermediate film of laminated glass.

In accordance with the invention, the method of embedding thin wires in the intermedate film of laminated glass, preferbly for heated panes, resides in pressing plastic filaments of the same base material as the laminated film, with wire wound around them in stretched helical coil configuration, into the film containing a higher amount of plasticizer than the filaments, and in making them disappear during the pressing procedure to form the laminate by diffusion of the plasticizer. The wire wound helically around the plastic filament can be made to adhere to the plastic filament immediately after the winding by temporary, local application of heat. The electrical contact between the wire and the lead can be advantageously established during the pressing procedure to form the laminate. Polyvinyl butyral can be used as base material for the film and the filaments.

The invention will now be described in the sequence of the method steps.

The wire intended for use is first fed to a winding machine, which winds it around a plastic filament displaced as carrier at uniform speed. The plastic filament is drawn off from a supply bobbin and fed to the actual winding apparatus, which winds the wire helically onto the uniformly advanced plastic filament from the wire supply bobbin, which rotates around the plastic filament. By suitably selecting the plastic filament feed and the speed at which the wire supply bobbin rotates around the filament, any helical configuration required for manufacture can be imparted to the fine wire which is to be wound onto the plastic filament. The plastic filament with thin wires wound around it in stretched helical coil configuration, as described above, is then wound onto bobbins at the exit end of the winding machine for further processing at a later stage, so as to collect and store it, in the event that it is not to be further processed directly.

On leaving the winding machine, the wire can be made to adhere to the temporarily softened surface of the plastic filament by interposed thermal treatment to ensure safer positioning of the wire helically wound around the plastic filament. This is carried out in the following manner. Before winding up, the filament with wire wound therearound is passed through a small tunnel oven, where it is softened to such an extend that the tensioned wire can impress itself into and remain adhered to the thus obtained adhesion base, once the filament has cooled down.

To avoid vision impairment resulting from differing light refraction between intermediate film and plastic filament, the same base material is to be used for the filament as for the film. A suitable base material is polyvinyl butyral, to which plasticizer must be added to obtain adequate adhesion to the glass. Since, for understandable reasons, it is normally only plastic filament dimensions of from 0.2 to 0.6 mm diameter that are practicable, it does, with a view to enabling favorable further processing, appear to be of advantage of increase the tear resistance of the filaments of the aforementioned sizes by way of a reduced plasticizer content, as compared with the film material used.

The plastic filament with thin wire wound around it in stretched helical coil configuration, having been wound up, is then subjected to further processing in line with known methods.

Instead of one single wire being helically wound around the plastic filament, several single wires intertwined with one another may be wound around the filament. Also, instead of the single wire, several single wires offset from one another with respect to the filament axis, may be wound around the plastic filament.

The plasic filament which has been drawn off from its bobbin and had wire wound around it, is wound, for example, onto a rotatable framework at a feed of from 0.5 to 5 mm per frame rotation, which depending on the apparatus construction, simultaneously produces two or more tensioned arrays.

For larger-scale production, it is recommended that a cradle be equipped with quite a large number of bobbins containing the plastic filament with wire helically wound therearound. This cradle enables the required amount of filaments with fine wire wound therearound to be simultaneously drawn off from the cradle in a tensioned state and conducted in fan-like arrangement over a work table by a comb. The table which is provided with clamping means, carries the film delivered from a storage container and prepared for lamination. Leads in the form of thin, tin-plated copper bands are pressed into this film by heated tools at the places indicated by the disc-shaped template located on the table beneath the film. The group of plastic filaments guided over the table in fan-like arrangement by the comb is clamped at the beginning and end of the table in front of the one and behind the other lead, whereupon the group of filaments can be separated from the cradle. At this stage, the next array can already be prepared for deposition by the cradle. The leads which have been pressed into the film and on which the plastic filaments with wire wound around them come to rest, are covered with a tin-plated copper band and secured in position.

The hitherto conventional soldering of the wires to the leads, entailing a considerable amount of work, can be eliminated, as it has become apparent that in the given circumstances sufficient pressure contact can be established during the subsequent pressing procedure to form the laminated pane, as to ensure current flow.

The film prepared in accordance with the above description is then embedded, together with the wire insert, between the readied glass panes, and secured in position. The sandwich is subjected to a pre-pressing procedure, for example, under vacuum and limited heat application, serving to press the plastic filaments far enough into the film for the two cover panes to be held in position by the intermediate film.

During the subsequent pressing procedure to form the laminated pane, the plasticizer of the intermediate film diffuses into the inserted plastic filaments containing less plasticizer until there is no more difference in the refraction value between film and filaments, and the latter disappear.

The invention will now be viewed in the light of an embodiment for quantity production.

A pre-stretched filament of 0.4 mm in diameter, made from a thermoplastic material, such as, for example, polyvinyl butyral, containing plasticizer in the approximate amount of 21%, is drawn off at uniform speed from a bobbin at the inlet end of a winding machine and conveyed through the hollow axis of the winding machine to a guide nozzle serving to impart taut guidance to the filament for the subsequent free movement. The winding apparatus rotatable about its hollow axis, carries a bobbin filled with tungsten wire of 0.02 mm in diameter. The wire is delivered from the bobbin by an appropriate guide means to the plastic filament immediately after it exists from the nozzle. When the winding machine is started, the wire winds itself helically, on account of the wire bobbin holder rotating around the hollow axis of the winding machine, onto the uniformly advanced filament. The filament feed can be adapted to the rotational speed of the winding machine such that a predetermined helical shape is imparted to the wire on the filament. In the present example, the filament feed was set at 0.8 mm per winding apparatus rotation, so that the pitch corresponds to twice the filament diameter. The plastic filament, which after leaving the guide nozzle has wire continuously wound around it, is finally conducted to a winding up means, by which it remains subjected to tensile stress until it is wound up.

The plastic filament with wire wound around it, which is advanced under tensile stress, passes through a tubular oven installed between the guiding nozzle and the winding up means. During the heat treatment the filament is temporarily heated at its surface until the latter softens and the tensioned wire can impress itself, whereby it remains adherent to the filament after cooling. The thus treated plastic filament with wire helically wound around and adhering to it, is then wound up.

Depending on the requirement, a number of such filled filament bobbins can be disposed in a cradle. 150 such bobbins containing plastic filaments of 0.4 mm in diameter with tungsten wire of 0.02 mm thickness wound around them in stretched helical coil configuration are required for the present example. The 150 filaments are first conveyed under tension from the cradle to a comb for adjustment of the mutual filament spacing. The comb spreads the filaments out in fan-like arrangement to form a 300 mm wide, parallel group at a distance of 1.6 mm from one another (corresponding to 2 mm spacing between the filament axes) and then conducted by a length-wise displaceable clamping means over a table provided with a template for the heated pane to be fabricated. A 0.76 mm thick, lamination foil, made of polyvinyle butyral with approximately 42% plasticizer content, drawn off from a supply bobbin, had previously been laid on the table against the template. With the disc-shaped template serving as a pattern, thin, tin-plated copper bands provided as leads for the heating current of the pane, were attached to the film by a heated tool at a spacing of approximately 1,300 mm. The moveable clamping means serves to guide the group of filaments over the foil between the two copper bands extending at right-angles thereto and clamp it to the table both in front of the first and behind the second copper band, so that an approximately 300 mm wide and 1,300 mm long array of filaments is formed. The filament group clamped to the table behind the comb can now be separated from the bobbins and subjected to further treatment. Meanwhile a further table can already be brought to the cradle and the above-described sequence of operation performed anew. The filament group clamped to the table is then attached to the pre-heated foil located thereunder, to secure it in position, by a roller which is made to pass along above it. After this step, the filaments conducted over the tin-plated copper bands are covered with similar copper bands.

The thus fabricated film is embedded between two glass panes. The entire device is provisionally secured in place to define its positioning. The sandwich in the net format of 300×1,300 mm is then subjected to vacuum treatment with simultaneous heat application. It causes the filaments to be pressed into the foil and establishes electrical contact between the wires and the leads.

This is followed by lamination under pressure and increased temperature. Pressure and temperature are measured such that by diffusion of the plasticizer of the film into the plastic filaments until a balance is reached, a uniform refraction index is established, and the plastic filaments lose their visibility and disappear.

The method according to the invention is, of course, not limited to his embodiment. It may be expedient to further process the plastic filament with wire helically wound therearound as a direct follow-up to the winding machine, for example, for single pieces or small lots. For quanity production, the drawing off procedure can be further developed to include a conveyor belt, in which case, one work table for all of the operations can be replaced, for example, by a separate one for each. In any case, expensive, specialized machines of limited efficiency can be dispensed with.

The method enables laminated panes to be fabricated with thin wires three-dimensionally inserted therein in uniformity finely undulating configuration. This arrangement of the wires reduces their perceptibility more than hitherto. Disturbing light reflections and interferences are no longer present, resulting in clarity of vision hitherto unaccomplished.

The simple fabrication according to the method of the invention leads to a considerable decrease in the production costs and enables a substantial increase in the manufacturing capacity, particularly in quantity production. The method enables production-line installation of heated panes in motor vehicles, which was hitherto impaired by the work expenditure and the production costs.

It is claimed:

1. Method of embedding thin wires in the intermediate film of transparent laminated glass, preferably for heated panes, characterized in that plastic filaments consisting of the same base material as the intermediate film and having wire wound around them in stretched helical coil configuration are pressed into the film contained a larger amount of plasticizer than the filaments, and made to disappear during the pressing procedure to form the laminate by diffusion of the plasticizer in the intermediate film into the filaments.

2. Method as claimed in claim 1, characterized in that the wire wound around the plastic filament in stretched helical coil configuration is made to adhere to the plastic filament immediately after the winding by temporary, local application of heat.

3. Method as claimed in claim 1 or claim 2, characterized in that the electrical contact between the wire and the leads is established during the pressing procedure to form the laminate.

4. Method as claim in claim 1 or claim 2, characterized in that polyvinyl butyral serves as base material for the film and the filament.

5. Method as claimed in claim 1 or claim 2, characterized in that the electrical contact between the wire and the leads is established during the pressing procedure to form the laminate, and in that polyvinyl butyral serves as base material for the film of the filament.

* * * * *